G. W. COOPER.
ATTACHMENT FOR ELEVATED POTATO DIGGERS.
APPLICATION FILED DEC. 10, 1909.
1,015,299.
Patented Jan. 23, 1912.
5 SHEETS—SHEET 1.
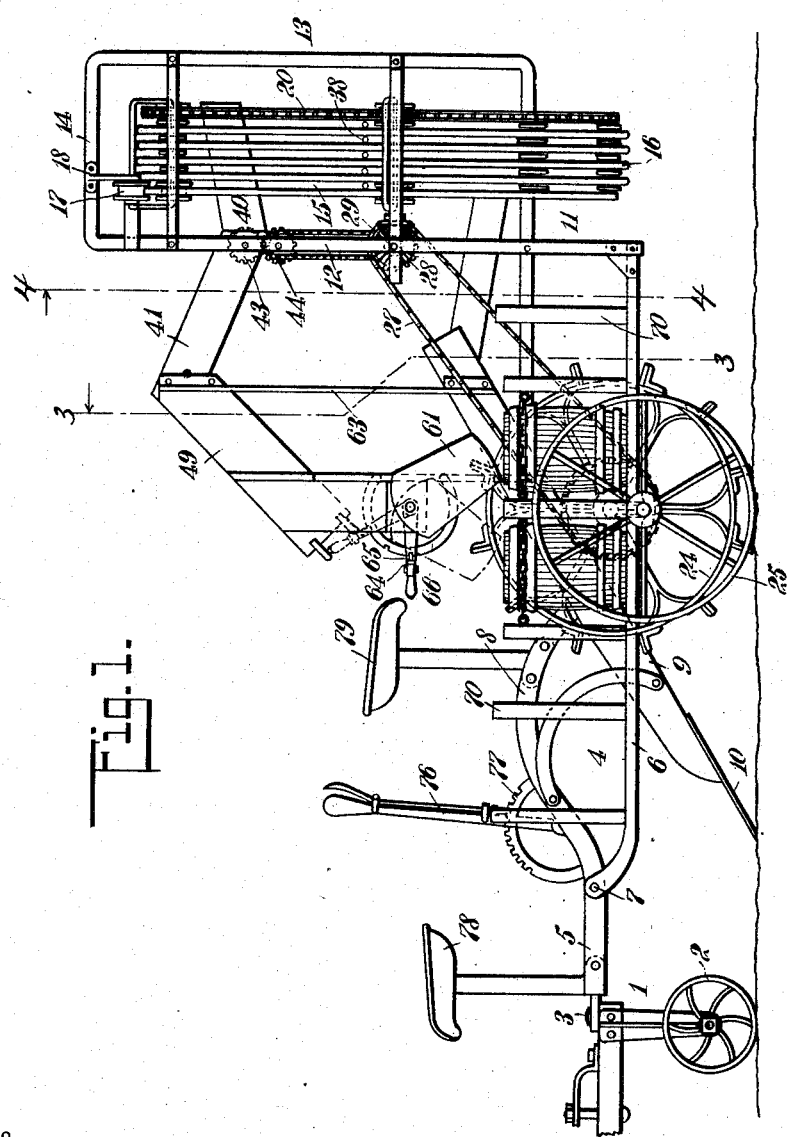
WITNESSES
L. Almquist
F. D. Ammen
INVENTOR
George W. Cooper
BY
Munn & Co.
ATTORNEYS G. W. COOPER.
ATTACHMENT FOR ELEVATED POTATO DIGGERS.
APPLICATION FILED DEC. 10, 1909.
1,015,299.
Patented Jan. 23, 1912.
5 SHEETS—SHEET 2.
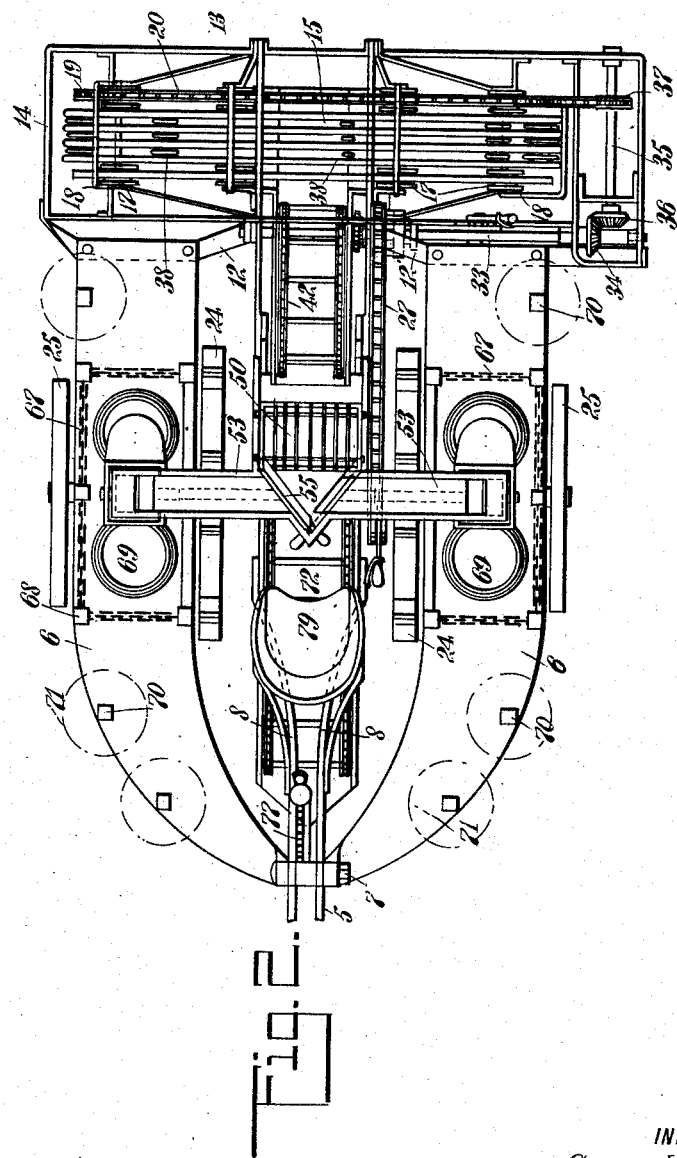
WITNESSES
INVENTOR
George W. Cooper
BY
ATTORNEYS G. W. COOPER.
ATTACHMENT FOR ELEVATED POTATO DIGGERS.
APPLICATION FILED DEC. 10, 1909.
1,015,299.
Patented Jan. 23, 1912.
5 SHEETS—SHEET 3.
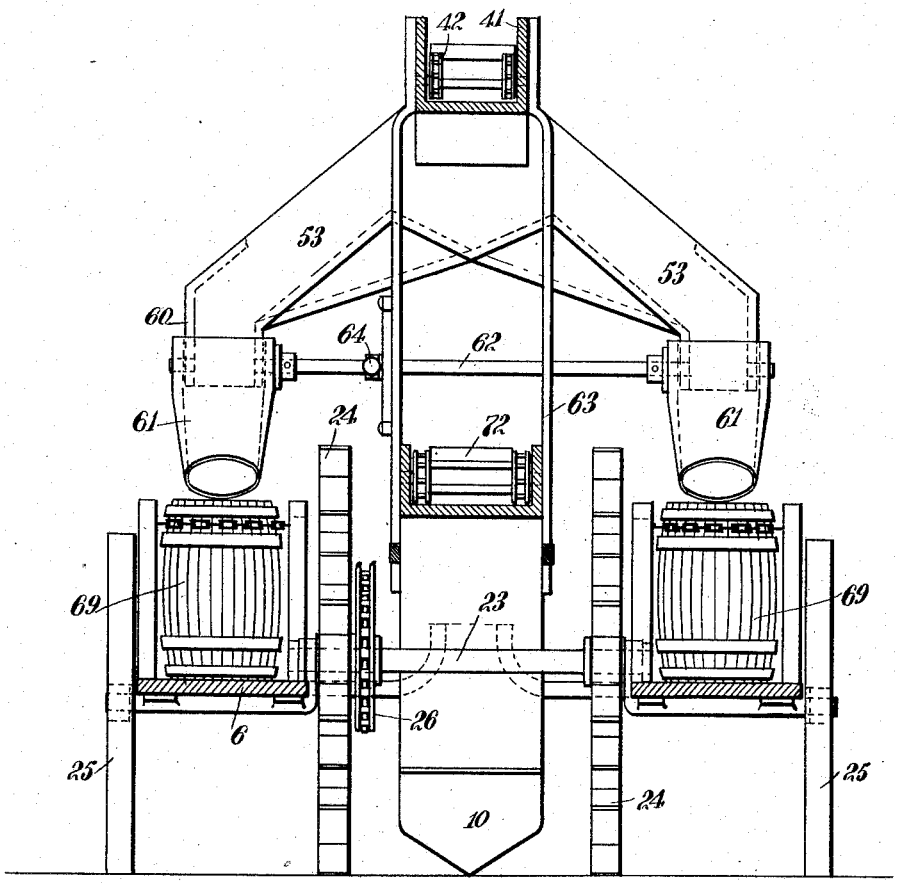
WITNESSES
INVENTOR
George W. Cooper
BY
ATTORNEYS

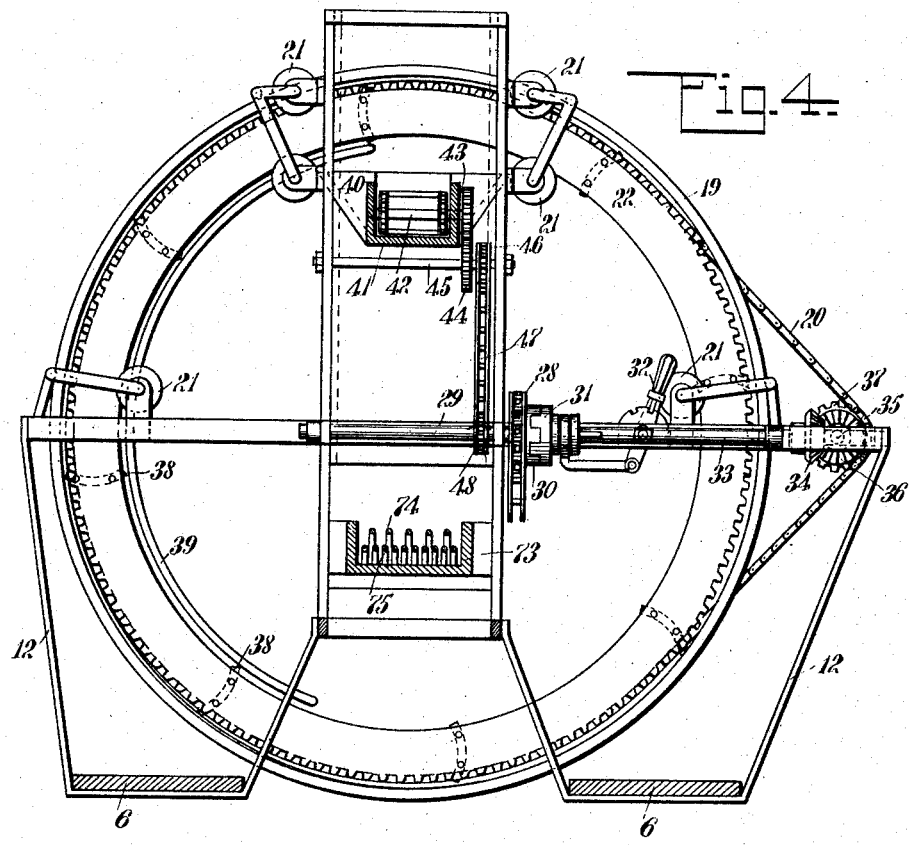

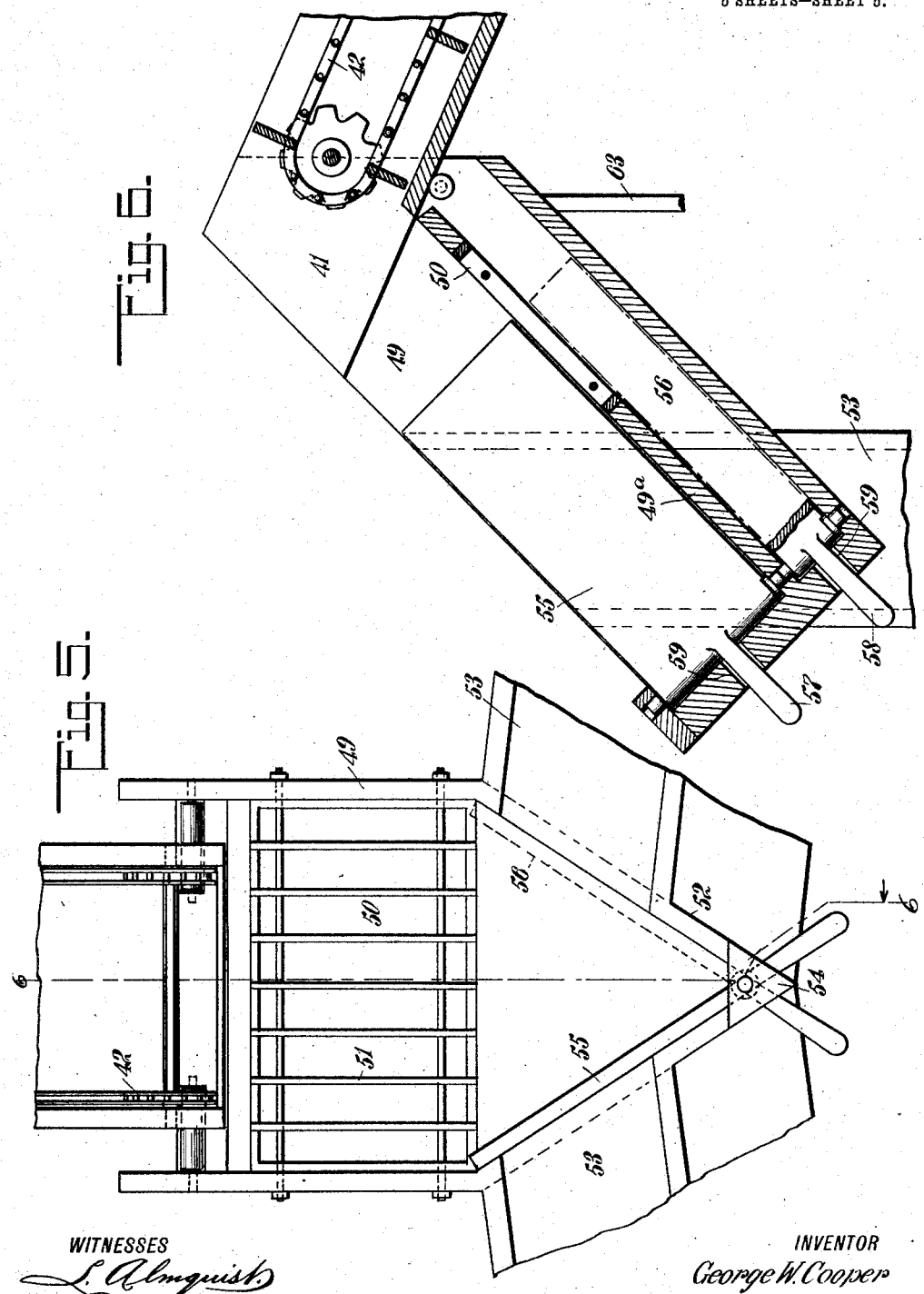

UNITED STATES PATENT OFFICE.

GEORGE WILLIAM COOPER, OF PATTEN, MAINE.

ATTACHMENT FOR ELEVATED POTATO-DIGGERS.

1,015,299. Specification of Letters Patent. Patented Jan. 23, 1912.

Application filed December 10, 1909. Serial No. 532,351.

*To all whom it may concern:*

Be it known that I, GEORGE W. COOPER, a citizen of the United States, and a resident of Patten, in the county of Penobscot and State of Maine, have invented a new and Improved Attachment for Elevated Potato-Diggers, of which the following is a full, clear, and exact description.

This invention relates to potato diggers of the class illustrated and described in my Patent No. 920,919.

The object of the present invention is to provide improved means for distributing and separating the potatoes when they are emptied into the barrels, and a further object of the invention is to construct the machine so as to facilitate the carrying of the empty barrels which are to be filled.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a machine provided with my invention; Fig. 2 is a plan of the machine shown in Fig. 1; Fig. 3 is a vertical section through the machine taken on the line 3—3 of Fig. 1 and looking forwardly; Fig. 4 is a vertical section taken on the line 4—4 of Fig. 1 and looking toward the rear; Fig. 5 is a plan projected upon an inclined plane and illustrating a part of the distributing means for the potatoes; and Fig. 6 is a vertical section through the parts shown in Fig. 5 taken on the line 6—6 of Fig. 5.

Referring more particularly to the parts, 1 represents the forward truck of the machine which is mounted upon a wheel 2, and this truck has a swivel pin 3 connecting it with the forward end of the main frame 4 of the machine. The forward end of the frame 4 comprises a pair of parallel frame bars 5 which extend rearwardly from the front end of the frame, and to the sides of these frame bars 5, side platforms 6 are attached by means of a common through bolt 7, as indicated most clearly in Fig. 1. The form of these platforms is clearly shown in Fig. 2. They are elongated in the longitudinal direction of the axis of the machine, and their forward ends are curved and turned inwardly so as to form horns, the ends of which converge and are attached by means of the bolt 7, as described above. The frame bars 5 between the platforms 6, are curved upwardly so as to form bows 8. The rear ends of these bows support a main chute or digger 9. This digger is in the form of an inclined trough, to the lower end of which a shovel or plow 10 is attached.

To the rear ends of the bars 5, and to the rear ends of the platforms 6, a back frame 11 is attached, said back frame including uprights 12 to which a wheel guard frame 13 is attached. This wheel guard 13 comprises side bars 14 which extend in a front and rear direction around the periphery of a wheel 15 which is rotatably mounted in the interior of the guard. This wheel is mounted to rotate on a horizontal axis extending in a front and rear direction. The body of the wheel is formed of parallel hoops or ribs 16, and the rim of the wheel runs on guide wheels 17 mounted in suitable brackets 18 on the outer side of the wheel 15 and attached to the guard frame 13, as will be readily understood. At the rear side of the wheel a sprocket wheel 19 is formed, about the rim of which a sprocket chain 20 passes for driving the wheel continuously, and in addition to the guide wheels 17 which are disposed on the outer side of the wheel, similar guide wheels 21 are provided on the inner side. These wheels roll on the inner and outer edges of an annular side plate 22, as indicated in Fig. 4. It should be understood that there are two of these side plates or flanges which are disposed a distance apart equal to the width of the wheel. The rearmost of these flanges is formed by the gear wheel 19 referred to above.

As indicated most clearly in Fig. 3, between the platforms 6 a main shaft or axle 23 is mounted, and on this axle driving wheels 24 are mounted which run upon the ground, as shown. The inner edges of the platforms 6 are attached to this axle adjacent to the wheels 24, as shown. On the outer sides of the platforms 6, outer wheels 25 are mounted, which also run upon the ground, these wheels, however, are not driving wheels and simply support the outer edges of the platforms. This axle 23 is provided with a sprocket wheel 26, over which runs a sprocket chain 27. This sprocket chain extends upwardly and rearwardly in an inclined direction and passes around a sprocket wheel 28 on a counter shaft 29 which is mounted in a transverse position, as indicated in Fig. 4, at the forward side of the guard frame 13. The sprocket wheel 28 is rigid with a clutch collar 30 which coöperates with a movable clutch collar 31 which is adapted to be slid along the shaft by means of a shifting lever 32. This collar 31 affords means for driving a short shaft 33 which extends over toward the side of the wheel and is provided with a bevel gear wheel 34 for driving a counter-shaft 35 at the left side of the machine, as indicated in Fig. 2. The forward end of the counter-shaft 35 is provided with a bevel gear 36 which meshes with the bevel gear 34, as shown. At a suitable point the shaft 35 is provided with a sprocket wheel 37, over which the aforesaid sprocket chain 20 passes, as indicated in Fig. 4.

Referring again to the wheel 15, and referring especially to Figs. 1 and 4, between the hoops 16, curved fingers 38 are attached, which form pockets for raising the potatoes which are thrown into the wheel in a manner which will be described more fully hereinafter. In order to assist in retaining the potatoes, the inner side of the wheel on the right side thereof, is provided with a curved guard hook or bow 39. The upper end of this hook 39 is disposed over a hopper 40 which is disposed under the upper portion of the rim of the wheel. This hopper inclines forwardly and downwardly so that the potatoes which it receives will be delivered to a conveyer chute 41 which inclines upwardly and forwardly. Within this conveyer chute a conveyer belt 42 is mounted, and this belt is driven from the rear end by means of a gear 43 which meshes with a similar gear wheel 44. This latter gear wheel 44 is rotatably mounted on a shaft 45 and is rigid with a sprocket wheel 46. This sprocket wheel is driven by means of a sprocket chain 47 which passes up over the shaft 29. The sprocket wheel passes up around a sprocket wheel 48 upon the shaft 29, as indicated in Fig. 4. The forward end of the conveyer chute 41 delivers to a second chute 49 which inclines forwardly and downwardly, as indicated in Fig. 1. The chute 49 is provided with a false bottom 49$^a$ in which there is mounted a screen or grid 50, said screen presenting a plurality of bars 51 extending longitudinally of the chute. The forward end of the chute is provided with converging side walls 52 and in these side walls 52, openings are provided, at which branch chutes or trunks 53 are attached, one of these branch chutes extending toward the right, and the other toward the left. The side walls 52 meet on the central axis of the chute 49, and at the meeting point or vertex 54 of the angle between them, shutters 55 and 56 are pivoted. These shutters have handles 57 and 58 respectively, which extend through the openings 59 formed through the walls 52 at this point. Each of these shutters is mounted in the triangular space between the inclined walls 52 so that they may close communication from the chute through either of the branches or trunks 53.

As indicated in Fig. 3, the outer ends of the trunks 53 are turned downwardly so as to form snouts 60, and on these snouts nozzles 61 are mounted, said nozzles being secured rigidly to a transverse shaft 62 mounted in the central frame 63 of the machine. The angular position of this shaft 62 is controlled by means of a lever 64, and this lever is provided with locking mechanism 65 coöperating with a segment 66 so as to hold the nozzles pointing toward the rear, as indicated in the full lines in Fig. 1, but inclining toward the front as indicated in the dotted lines. These nozzles 61 are disposed over substantially the middle points of the platforms 6, as indicated in Fig. 2, and this portion of the platforms is inclosed by means of chains 67 which constitute rails connecting upright posts 68, as indicated most clearly in Fig. 2. In this space barrels 69 may be placed to be filled with the potatoes. At suitable points the platforms 6 are provided with uprights or posts 70 and these posts are adapted to hold barrels in an inverted position, said barrels being indicated by the dotted lines 71 in Fig. 2. As the barrels 69 under the nozzles become filled, they will be removed and empty barrels placed in their stead.

As indicated in Fig. 3, the forward end of the shovel 10 is formed with a tapered point, and within the digger trough 9 a conveyer 72 is mounted and this conveyer is driven in any suitable manner, not shown, so that the potatoes which are dug from the earth pass upwardly and rearwardly. The rear end of this digger delivers to a shaker box 73, indicated in Fig. 4. This shaker box extends rearwardly into and beyond the interior of the wheel 15. It presents a plurality of elevated bars 74, disposed a considerable distance apart, and a plurality of similar bars 75, which are disposed close together. These bars allow the dirt to pass between them, but hold the potatoes and guide them into the carrier wheel 15. The bars 74 allow the potatoes to pass between them, but do not allow potato tops, sods and large stones to pass between them. During the operation of the machine, the potatoes on the bars 75 are shaken into the carrier wheel 15, and the potato tops, sods, etc., on the bars 74 are shaken and pushed rearwardly by a pushing device (not illustrated) into and beyond the carrier wheel 15, and drop to the ground.

The digger 9 may be adjusted by means of an adjusting lever 76 coöperating with a quadrant 77 and connected with the inner edges of the platforms, as shown. At the forward end of the bars 5, a seat 78 is provided for the driver, and near the bows 8 of these bars, a seat 79 is attached where the operator sits for controlling the operation of the nozzles 61 which fill the barrels, and to operate the shutters 55 and 56; also to remove decayed potatoes, stones, and other foreign substances.

In the operation of the machine the potatoes pass from the wheel into the hopper 40, from which they are taken by the belt in the conveyer chute 41. The potatoes then pass down the chute 49, passing over the screen 50. The smaller potatoes pass between the bars 51, and the larger potatoes pass over the screen without falling through. By means of the shutters 55 and 56 the large potatoes may be guided into the right trunk 53 or into the left trunk 53. By means of the lever 64 and the shaft 62, the nozzles may be inclined so as to fill either of the two barrels 69 on the platforms. In this way the potatoes dug will be delivered to the barrels in a sorted condition.

The wheel 15 and frame may be attached to the shaker box 73, which is connected to the digger frame 9 (see Fig. 7), thus disconnecting the platforms 6 at the rear end (see Fig. 3). And a hinge may be added in the axles of the wheels 25, and also hinges on the platform frame 6 at or near the bolt 7 (see Fig. 1), thus allowing the platforms 6 and the wheels 25 to play up and down on rough ground.

Having thus described my invention, I claim as new and desire to secure by Letters Patent—

1. In a machine of the class described, in combination, a frame, a pair of platforms attached to said frame at the forward end thereof, means for supporting a plurality of empty receptacles on said platforms, wheels mounted between said platforms, a delivery chute disposed on the central axis of said machine between said platforms, branch trunks connected with said delivery chute and leading to points over said platforms, said trunks being disposed over the axis of said wheels, a screen in said delivery chute adapted to separate the potatoes, means for guiding the potatoes which pass over said screen into either of said trunks, means for guiding the potatoes which pass through said screen into either of said trunks, and means for raising and delivering potatoes to said delivery chute.

2. In a machine of the class described, in combination, a frame, platforms attached to said frame at the front and rear ends thereof, a transverse axle mounted between said platforms, driving wheels mounted on said transverse axle, outside wheels secured to the outer edges of said platforms, a delivery chute disposed over the central axis of said frame, means for raising and delivering potatoes to said delivery chute, driving connections between said means and said driving wheels, a screen in said delivery chute, trunks leading from said delivery chute to points over said platforms, means for guiding the potatoes which pass over said screen into either of said trunks, and means for guiding the potatoes which pass through said screen into either of said trunks.

In testimony whereof I have signed my name to this specification in the presence of two subscribing witnesses.

GEORGE WILLIAM COOPER.

Witnesses:
 HALBERT P. GARDNER,
 FRED W. HODGMAN.

---

Copies of this patent may be obtained for five cents each, by addressing the "Commissioner of Patents, Washington, D. C."